(12) United States Patent
Bogers

(10) Patent No.: US 6,511,596 B1
(45) Date of Patent: Jan. 28, 2003

(54) APPARATUS FOR CLEANING LIQUIDS

(76) Inventor: Christianus J. Bogers, Zandstraat 196, NL-4615 CN, Bergen Op Zoom (NL)

( * ) Notice: Subject to any disclaimer, the term of this patent is extended or adjusted under 35 U.S.C. 154(b) by 0 days.

(21) Appl. No.: 09/508,759

(22) PCT Filed: Aug. 27, 1998

(86) PCT No.: PCT/NL98/00483

§ 371 (c)(1),
(2), (4) Date: Mar. 7, 2001

(87) PCT Pub. No.: WO99/13960

PCT Pub. Date: Mar. 25, 1999

(30) Foreign Application Priority Data

Sep. 17, 1997 (NL) .................................................. 1007063

(51) Int. Cl.[7] .......................... B01D 36/00; B04B 3/00; B04B 3/02; B04B 7/16
(52) U.S. Cl. ........................ 210/295; 210/407; 494/36; 494/48; 494/79
(58) Field of Search ................................. 210/295, 407, 210/415; 494/36, 48, 79

(56) References Cited

U.S. PATENT DOCUMENTS

| 2,733,855 A | * | 2/1956 | McCoy |
| 3,432,091 A | * | 3/1969 | Beazley |
| 5,656,164 A | * | 8/1997 | Vado et al. |

FOREIGN PATENT DOCUMENTS

| AU | 429588 | 10/1972 |
| DE | 3405153 | 8/1985 |
| EP | 0743096 | 11/1996 |
| WO | 96/16744 | 6/1996 |

* cited by examiner

Primary Examiner—Thomas M. Lithgow
(74) Attorney, Agent, or Firm—Banner & Witcoff, LTD.

(57) ABSTRACT

The invention relates to an apparatus comprising a drum drivable in rotation having a conical jacket wall which is mounted on a fixedly arranged core; supply means for carrying the contaminated liquid into the interior of the drum; discharge means for discharging the heavy contaminants from the part of the drum in the proximity of the largest jacket diameter; an at least substantially cylindrical ceramic filter received in the core; and drainage means arranged in the fixed core for draining the cleaned liquid.

10 Claims, 3 Drawing Sheets

APPARATUS FOR CLEANING LIQUIDS

The present invention relates to an apparatus for cleaning contaminated fluids.

Such apparatus are generally known, for instance in the form of filters, for instance ceramic filters.

Filters, in particular ceramic filters, are suitable for removal from fluids, for instance liquids, wherein gases are not however excluded, of materials, for instance contaminants, with molecules larger than the molecules of the basic fluid. Through use of a filter with the correct dimensions the basic fluid can pass through the filter while the contaminants with molecules of larger dimensions are restrained by the filter.

Cleaning apparatus for fluids are further known which make use of separating mechanisms based on mass. An example hereof are centrifuges, wherein contaminants with a higher density or a lower density than the basic fluid can be separated from the basic fluid. In order to enable cleaning of fluids which are contaminated with contaminants with a higher density and with contaminants with larger molecular dimensions, two separate devices must be used according to the prior art. This results in costly and complicated apparatus.

DE-A-3305153 provides a single apparatus with which contaminants with a higher density can be removed as well contaminants with larger molecular dimensions.

DE-A-3405153 discloses an apparatus for cleaning contaminated fluids, comprising a combination of a centrifuge for removal from the contaminated liquid of contaminants with a specific gravity other than the liquid and a filter for removal from the liquid of contaminants which have molecules with larger dimensions than the liquid molecules, the combination being integrated into the apparatus, the apparatus comprising:

- a drum drivable in rotation having a conical jacket wall;
- supply means for carrying the contaminated liquid into the interior of the drum, the supply means comprising a pump for developping the pressure required for the ceramic filter;
- discharge means (15, 19, 20) for discharging the heavy contaminants from the part of the drum (14, 15, 17, 18) in the proximity of the largest jacket diameter;
- an at least substantially cylindrical ceramic filter (6) received in the core; and
- drainage means (11) for draining the cleaned liquid.

In this prior art the ceramic filter relates to substantial forces which may cause damage.

As a result of these measures use can be made of a single apparatus which can be of compact construction.

It will be apparent that this will result in an attractive solution at many locations.

In order to remove contaminants with a greater specific gravity, use can be made of the apparatus as according to a first preferred embodiment which comprises:

- a drum drivable in rotation having a conical jacket wall which is mounted on a fixedly arranged core;
- supply means for carrying the contaminated liquid into the interior of the drum;
- discharge means for discharging the heavy contaminants from the part of the drum in the proximity of the largest jacket diameter;
- an at least substantially cylindrical ceramic filter received in the core; and
- drainage means arranged in the fixed core for draining the cleaned liquid.

It will be apparent that it is also possible to provide such an apparatus wherein contaminants with a lower density can be removed. Such an apparatus will then have to be constructed with the filter on the outside, which will certainly entail technical problems; such a ceramic filter will then for instance have to be assembled from segments.

According to another preferred embodiment, the discharge means comprise a moving device for causing the drum jacket and the end wall with the smaller diameter to move away from the end wall. Causing the drum jacket to move away from the end wall results in a gap between drum jacket and end wall with which the contaminants can be discharged.

According to yet another preferred embodiment, the end wall with the smaller diameter is mounted on a central, stationary shaft which is drivable in its lengthwise direction, and the drum jacket and the larger end wall are mutually connected by a connection allowing of an axial movement. This results in a structurally advantageous embodiment .

According to yet another preferred embodiment, radially extending partitions connected to the jacket are arranged in the drum. The rotating movement of the liquid is hereby enhanced, so that the effectiveness of the centrifuge action is increased.

According to another preferred embodiment, walls extending substantially tangentially are arranged on the inner side of the partitions. This results in a sturdier construction.

According to yet another preferred embodiment, the distance in radial direction between the wall and the filter varies; during rotation this results in pressure variations on the ceramic filter, whereby the action thereof is improved.

Other attractive preferred embodiments are stated in the remaining claims.

BRIEF DESCRIPTION OF THE DRAWINGS

The present invention will be elucidated hereinbelow with reference to the annexed drawings, in which.

DETAILED DESCRIPTION OF THE INVENTION

Figure 1:
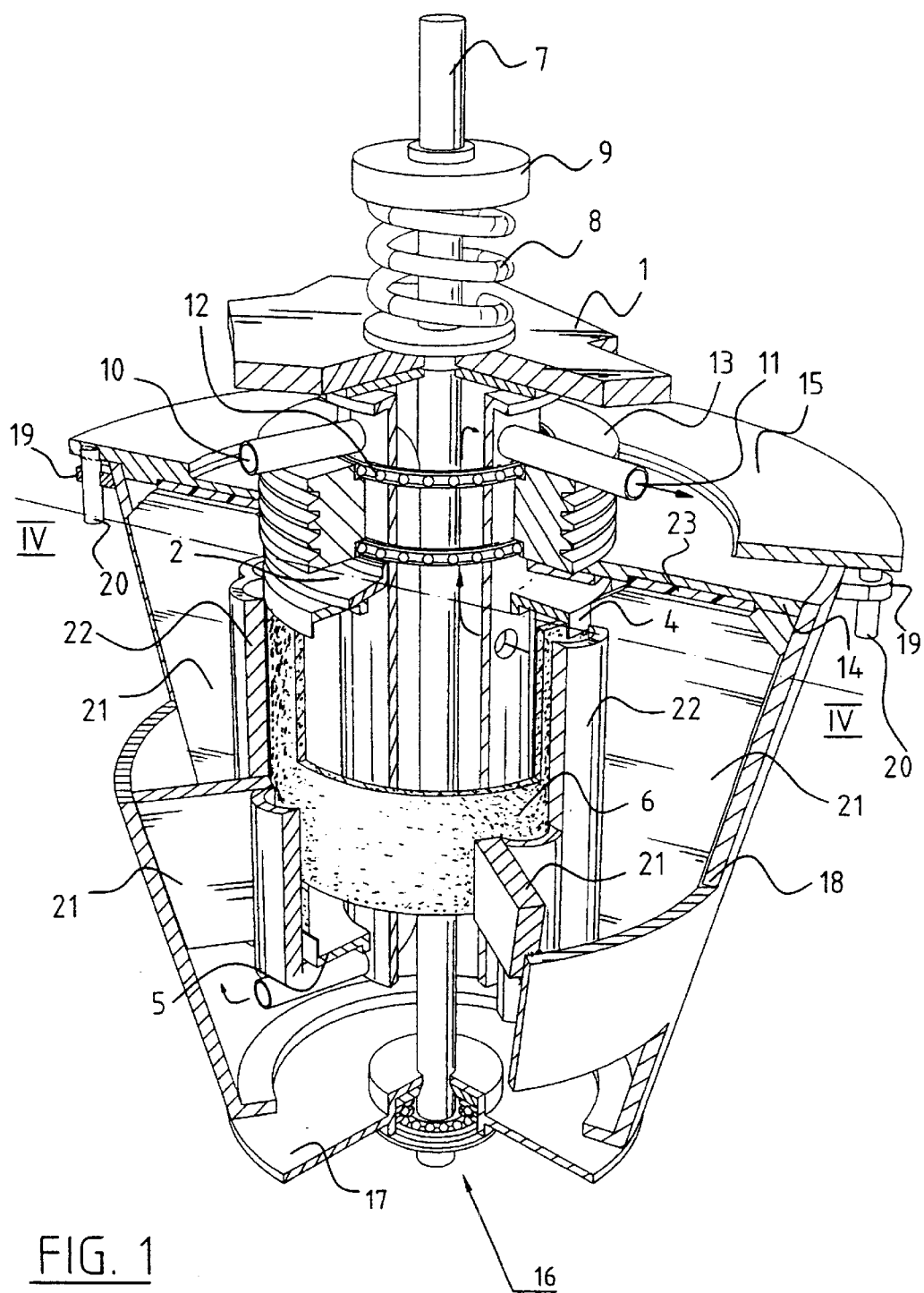
FIG. 1 shows a broken away, perspective view of an apparatus according to the invention.
Figure 3:
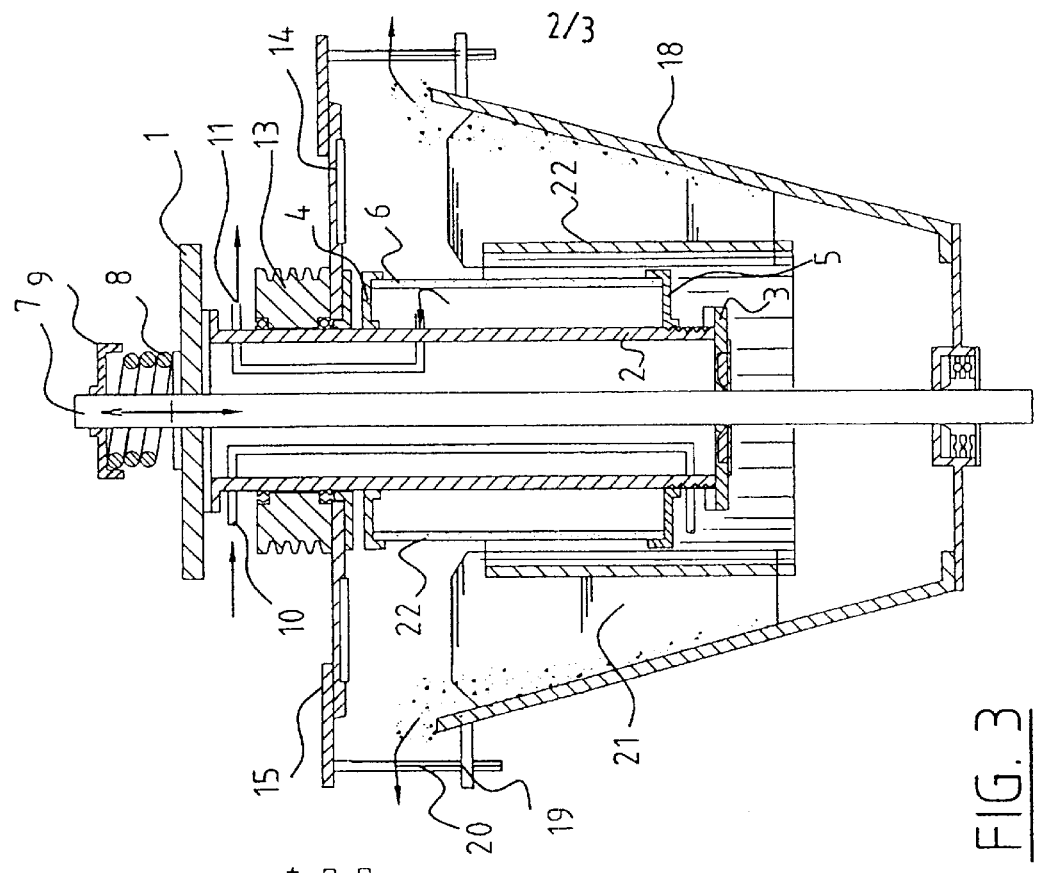
FIG. 3 shows a cross-sectional view corresponding with FIG. 2 during discharge of the heavy contaminants collected by the centrifuge.
Figure 2:
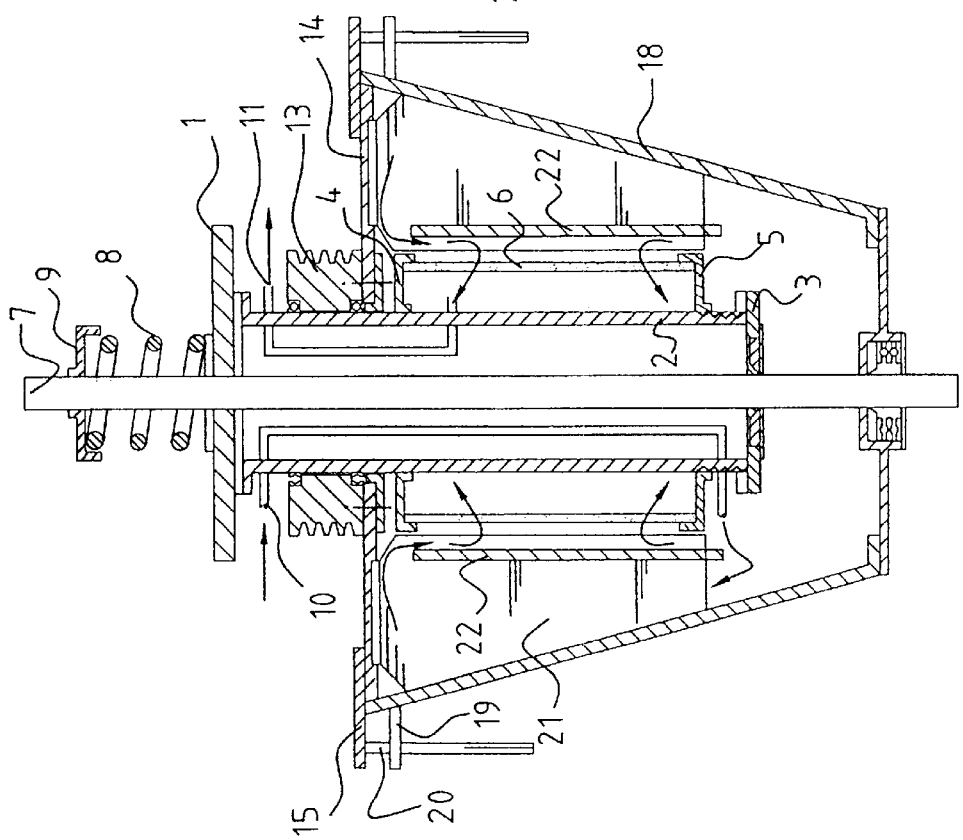
FIG. 2 is a schematic, cross-sectional view of the apparatus shown in FIG. 1 by way of elucidation of the operation of the ceramic filter.
Figure 4:
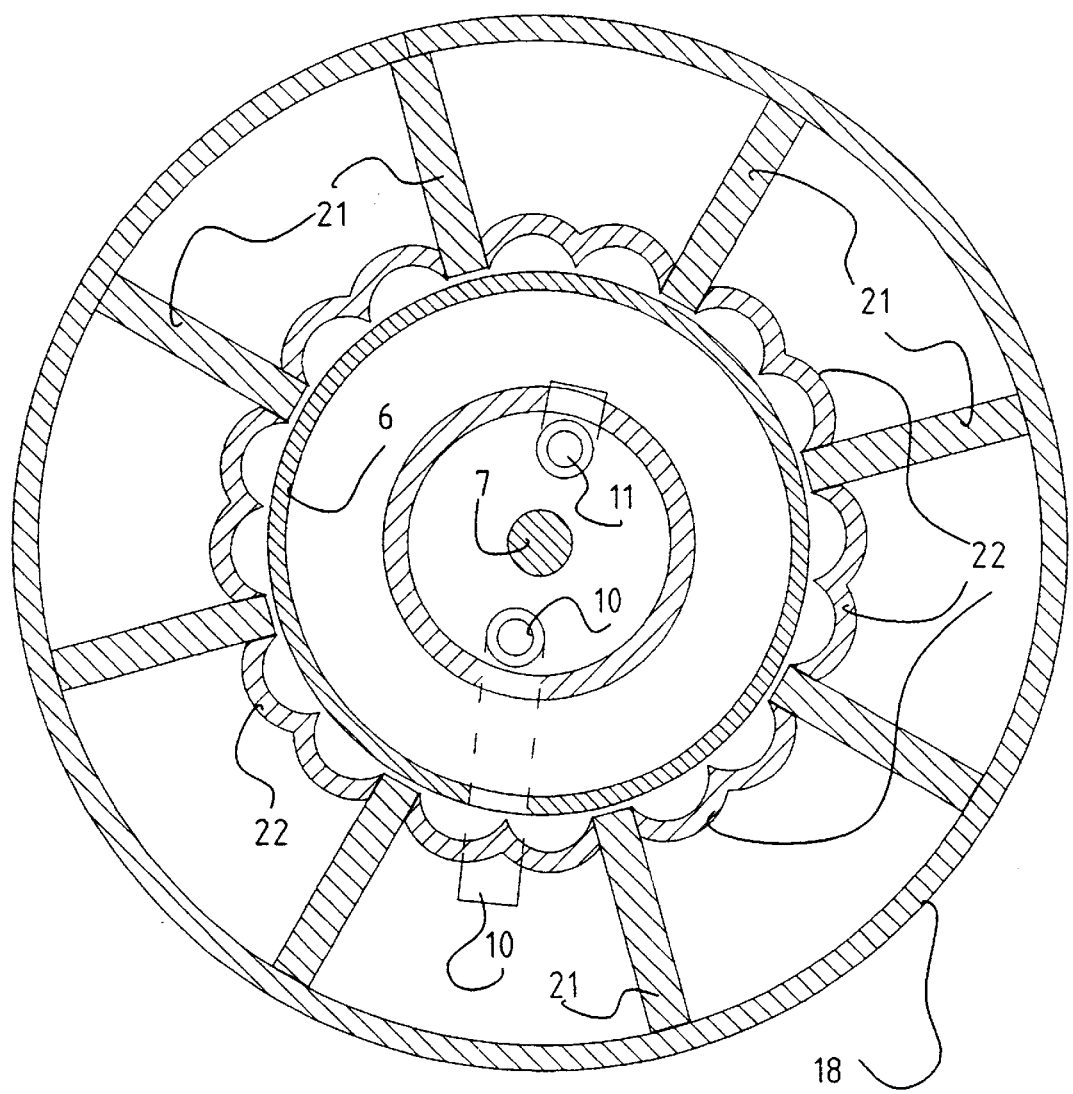
FIG. 4 shows a cross-sectional view along the line IV—IV in FIG. 1.

FIG. 1 shows an apparatus according to the present invention which is mounted on a plate. Mounted on the underside of plate 1 is a fixed, downward extending cylinder 2. The cylinder is closed on its underside by a flange 3. An upper filter flange 4 is further fixed to cylinder 2, as is a lower filter flange 5. A cylindrical ceramic filter 6 is enclosed by the two filter flanges 4, 5.

A control rod 7 further extends through the centre of the fixed inner cylinder 2. Control rod 7 is mounted at its top side in plate 1 and is mounted at its bottom side in flange 3. The central control rod 7 is movable in vertical direction but is held in its upper position by means of a helical spring 8 and a disc 9 placed fixedly on control rod 7.

For supply to the interior of the drum use is made of a feed conduit 10. This latter, which is supplied by a pump so as to be able to develop the required pressure for the ceramic filter, leads through the wall of the fixed inner cylinder 2, downward through fixed inner cylinder 2, and finally debouches under the filter in the inner cylinder.

Use is made for draining the filtered liquid of a drain conduit 11 which begins on the inside of the ceramic filter, extends through fixed inner cylinder 2 into the interior of this cylinder, and subsequently extends once again through this cylinder 2 to the outside.

The apparatus otherwise comprises a fixed bearing 12, which is formed for instance by a rolling bearing, on which is mounted a belt pulley 13. On the underside of belt pulley 13 is arranged an end wall of the drum, this being the end wall 14 with the larger diameter. Arranged on the outside of this wall is a ring 15 which overlaps wall 14.

A second, or movable, bearing 16 is further arranged which is fixed to control rod 7 and to the rotating part of which the second, or small, end wall 17 of the drum is fixed. As a result of the fact that control rod 7 is movable in vertical direction, bearing 16 and the end wall 17 mounted rotatably thereon is likewise movable in vertical direction. This is also the case for the conical drum jacket 18 which is mounted fixedly on the small end wall 17. It is noted here that the large end wall 14 is separate from cylinder jacket 18. Outward extending ears 19 are arranged at regular distances on the top side of drum jacket 18. On the underside of ring 15 are arranged pins 20 which extend through ears 19 and bring about a tangential and radial fixation of ring 15 relative to drum jacket 18 while still allowing an axial displacement of both elements.

Walls 21 extending radially inward are arranged in drum 18. These are fixedly connected to drum jacket 18. On the underside of the large end wall 14 at the position of radial walls 21 are arranged cushions 28 manufactured from resilient sealing material which provide a good sealing. Radial walls 21 are further connected on their inner side by an arched wall 22 extending substantially in tangential direction.

The operation of the apparatus according to the invention will now be described.

As stated, belt pulley 13 is driven in rotation by means of a drive device not shown in the drawing, for instance an electric motor, which is connected by means of drive belts, likewise not shown in the drawing, to belt pulley 13. The elements connected thereto, i.e. the large end wall 14 and ring 15, are thus also driven in rotation. This is also the case for pins 20, ears 19 and therefore drum jacket 18 and the small end wall 17 and the elements fixedly connected thereto and situated in the interior of the drum, such as radial walls 21 and the tangential arched wall 22.

Liquid for cleaning is supplied via feed conduit 10 by means of a pump, likewise not shown in the drawing. This liquid enters the space between radial walls 21 and is carried along in rotation therewith. As a result of the centrifugal force the liquid will collect in the vicinity of the largest radius of the drum, i.e. in the proximity of the dividing line between the large end wall 14 and drum jacket 18.

When sufficient liquid is present, the whole space in the interior of the drum will be filled with liquid. As a consequence of said force, the heavy components of the liquid will collect in the proximity of the dividing line between the large end wall 14 and drum jacket 18, while the lighter components will collect further towards the inside, i.e. in the vicinity of the filter 6 which is otherwise stationary. These elements are pressed through ceramic filter 6 by the pumping action, wherein the contaminants remain behind and the cleaned liquid is pressed through the filter and drained via drainage conduit 11. The contaminants herein remain behind on the filter surface.

As a consequence of the fact that the liquid rotates because it is carried along by the drum and the elements present therein, the contaminants will adhere only with difficulty to the filter. The danger of filter blockage is hereby reduced. This effect is reinforced still further by the fact that the tangential wall 22 is arched. A pressure gradient changing rapidly in time is hereby created which likewise prevents adhesion of the contaminants to the filter.

It will be apparent that both types of contaminant, that is the contaminants with a higher specific gravity and the contaminants with larger molecular dimensions, will remain behind in the drum.

Both types of contaminant will periodically have to be removed; those from the filter by generating a counterflow in the usual manner either with a valve system or by applying a separate pump, and those from the centrifuge by moving control rod 7 downward by means of disc 9 and therewith drum jacket 18 and the elements connected fixedly thereto. A gap is hereby created between drum jacket 18 and the large end wall 14 which can be used to discharge the heavy contaminants. In order to actually obtain a discharging action, it is important that the drum then rotates.

It is of course attractive to have these two cleaning operations take place perhaps simultaneously or, if this is technically impossible, in rapid succession. The normal cleaning process need then only be interrupted once. However, this is a consideration which depends mainly on the dimensioning of the diverse components and the nature of the contaminants.

I claim:

1. Apparatus for cleaning contaminated fluids, comprising a combination of a centrifuge for removal from the contaminated liquid of contaminants with a specific gravity other than the liquid and a filter (6) for removal from the liquid of contaminants which have molecules with larger dimensions than the liquid molecules, the combination being integrated in the apparatus, the apparatus comprising:

a drum (14, 15, 17, 18) drivable in rotation, having a conical jacket wall (18), large diameter end wall (14, 15) and small diameter end wall (17), said jacket wall being fixedly attached to said small diameter end wall;

supply means (10) for carrying the contaminated liquid into the interior of the drum (14, 15, 17, 18), the supply means comprising a pump for developing the pressure required for the ceramic filter;

discharge means (15, 19, 20) for discharging the heavy contaminants from the part of the drum (14, 15, 17, 18) in the proximity of the large diameter end wall;

an at least substantially cylindrical ceramic filter (6) received in the core of the drum; and drainage means (11) for draining the cleaned liquid, characterized in that the rotating jacket wall (18) is mounted on a fixedly arranged core (2, 4, 5), the ceramic filter (6) is received in the core (2, 4, 5), and the drainage means are arranged in the fixed core (2, 4, 5,).

2. Apparatus as claimed in claim 1, characterized in that the discharge means comprise a moving device (7, 19, 20) for causing the drum jacket (18) and the end wall with the smaller diameter (17) to move away from the end wall (14, 15).

3. Apparatus as claimed in claim 2, characterized in that the small diameter end wall (17) is mounted on a central, stationary shaft (7) which is drivable in its lengthwise direction, and that the drum jacket (18) and the large end wall (14, 15) are mutually connected by a connection (19, 20) allowing of a relative axial movement between said large end wall and said jacket.

4. Apparatus as claimed in claim 1, characterized in that radially extending partitions (21) connected to the jacket (18) are arranged in the drum.

5. Apparatus as claimed in claim 4, characterized in that walls (22) extending substantially tangentially are arranged on the inner side of the partitions (21).

6. Apparatus as claimed in claim 5, characterized in that the walls (22) are arched to provide variable distance in the radial direction between the walls (22) and the filter (6).

7. Apparatus as claimed in claim 2, characterized in that radially extending partitions (21) connected to the jacket (18) are arranged in the drum.

8. Apparatus as claimed in claim 3, characterized in that radially extending partitions (21) connected to the jacket (18) are arranged in the drum.

9. Apparatus as claimed in claim 8, characterized in that walls (22) extending substantially tangentially are arranged on the inner side of the partitions (21).

10. Apparatus as claimed in claim 7, characterized in that walls (22) extending substantially tangentially are arranged on the inner side of the partitions (21).

* * * * *